United States Patent
Herstek et al.

[19]

[11] Patent Number: 5,609,539
[45] Date of Patent: Mar. 11, 1997

[54] TRANSMISSION MEANS FOR TRANSMITTING A ROTARY MOVEMENT

[76] Inventors: Jozef Herstek, Bartosovce 97, 086 42 Hertnik, Slovakia; Bartolomej Janek, Smrekova 7, 08001 Presov, Slovakia

[21] Appl. No.: 492,097
[22] PCT Filed: Dec. 30, 1992
[86] PCT No.: PCT/SK93/00005
   § 371 Date: Jun. 29, 1995
   § 102(e) Date: Jun. 29, 1995
[87] PCT Pub. No.: WO94/16242
   PCT Pub. Date: Jul. 21, 1994

[30] Foreign Application Priority Data

Dec. 31, 1992 [CZ] Czech Rep. ............................ 04049-92

[51] Int. Cl.⁶ ............................................................ F16H 1/32
[52] U.S. Cl. ................................................................ 475/168
[58] Field of Search ...................................... 475/168, 180

[56] References Cited

U.S. PATENT DOCUMENTS

| 2,704,459 | 3/1955 | Nanni | 475/168 |
| 3,910,733 | 10/1975 | Grove | 475/168 |
| 3,979,167 | 9/1976 | Grove | 475/168 |

*Primary Examiner*—Dirk Wright
*Attorney, Agent, or Firm*—Horst M. Kasper

[57] ABSTRACT

The invention relates to a transmission means for transmitting a rotary movement, having a driven toothed wheel (1) provided with an internal toothing (2), which engages with an external toothing (12) of a driving toothed wheel (11). The internal toothing (2) and the external toothing (12) comprise-interchangeable entrainment means (4, 14), which are mounted in receiving means (3, 13) and have a circular cross-section (FIG. 1).

21 Claims, 3 Drawing Sheets

TRANSMISSION MEANS FOR TRANSMITTING A ROTARY MOVEMENT

The invention relates to a transmission means for transmitting a rotary movement in accordance with the preamble of claim 1.

Transmission means of the initially mentioned type are known and described, for example, in EP-A 211 687. In such case, cylindrical entrainment means are provided, which can be brought into engagement both with the internal toothing and with the external toothing of the toothed wheels, which co-operate with one another. Separate entrainment means are involved, therefore, which engage in the toothing of the respective toothed wheel. However, there is a line contact between the entrainment means and the teeth here, since the cross-sections of the entrainment means and the teeth are different. In consequence, the teeth are always stressed and considerably charged thereby, and such may lead to premature wear both of the teeth and of the entrainment means. Furthermore, a spur wheel transmission means is disclosed in DE-A 912 412, having the power of rolling bodies transmitted by a ball, or respectively balls, and rollers. An internal toothing and an external toothing in the sense of the invention are not disclosed. It is thereby significant, in the known case, that two pairs at a time co-operate with each other at the most, such being in the form of ball/ball or ball/cylinder. An additional disadvantage of this transmission means resides in the magnitude of the power transmission of the co-operating pairs (ball/ball or respectively ball/cylinder), where the power is transmitted at certain points. This also causes the entrainment means to wear prematurely. Finally, a hydraulic motor is illustrated in U.S. Pat. No. 4,394,112, wherein the internal toothed wheel and the external toothed wheel are provided with cylindrical entrainment means. In such case, the toothed wheels are so disposed relative to one another that a tight separation is always ensured for the chambers of the hydraulic motor. Because of this fact, high marginal stresses are produced in the contact region of the cylinder pairs, and such stresses considerably impair the transmission of power from the co-operating cylinder pairs.

On the basis of the above prior art, the basic object of the invention is to provide a remedy here.

The set object is achieved, according to the invention, by the features of claim 1.

Additional expedient and advantageous features of the invention are described in the dependent claims.

The external toothing of the drive wheel comprises interchangeable entrainment means, which have a circular cross-section and are mounted in axially extending receiving means, which are provided on the outer circumference of the drive wheel, these receiving means being uniformly distributed over the outer circumference. The internal toothing comprises interchangeable entrainment means, which have a circular cross-section and are mounted in axially extending receiving means of the toothed wheel disposed on the inner circumference, said receiving means having a uniform spacing therebetween. The receiving means of the toothed wheels have an arcuate or gothic cross-section.

In their seating region, the receiving means are provided with lubrication grooves, which contribute towards the formation of a lubricating layer. The entrainment means of the toothed wheels are rollers having a linear profile or a profile which is slightly modified on both sides. In such case, all of the entrainment means of the driven toothed wheel and all of the entrainment means of the driving toothed wheel have the same cross-section in a common radial sectional plane. The entrainment means of the toothed wheels are rotatably mounted in the receiving means. The receiving means may be provided with coverings, which have a suitable rolling property and sufficient strength. The difference in the number of teeth of the internal toothing and of the external toothing is dependent on the transmission. The entrainment means of the driven toothed wheel may also be provided in a modified configuration. In such case, they are formed from sleeves, which are mounted on pins with a small clearance. The sleeves are secured at their two axial end sides. By using interchangeable entrainment means for both toothed wheels, it is possible to replace the entrainment means by new ones after their service-life has been exceeded or if they have become damaged. In consequence, an extremely long service-life is achieved for the toothed wheels. By producing the entrainment means and the main bodies of the toothed wheels separately, intentional and optimum materials may be selected without restriction. Thus, for example, the entrainment means are produced from materials, the hardness of which is 58–65 HRC, thereby permitting the entrainment means to be charged with extremely high pressures. By comparison, the main body of the toothed wheel may be selected from materials having high viscosity. The simplest geometrical configuration may be selected for the entrainment means in order to achieve a high mean accuracy, a high level of accuracy in respect of configuration and the required roughness for the surface. Furthermore, a high mean accuracy may be increased by selecting (sorting) the entrainment means. The separate production of the entrainment means and the main bodies permits a high level of production accuracy, the differences in respect of the cylindrical form (0) being less than 0.8 (mic.m) and the differences in respect of the roughness being in the range of Ro=0.05–0.1 (mic.m). The above-mentioned advantages, namely the high accuracy in respect of measurement, the high accuracy in respect of configuration and the high quality of the surface, have an important influence on a continuous entrainment and, in consequence, also on the continuous running of the transmission means. This also results in a proportional distribution of the load between a plurality of co-operating pairs of entrainment means, a high kinematic running accuracy and a high strength for the toothing. By selecting the cylindrical entrainment means, it is possible to mount such rotatably in the corresponding receiving means, whereby additional advantages can be achieved. Frictions are reduced in the region of the high concentration of contact stresses between co-operating pairs of entrainment means and displaced to regions having low stresses, i.e. contact regions of the elements and receiving means. In consequence, the toothing becomes less worn, this being not least because of the fact that the entrainment means can be produced from very hard material. The local charging of the pinion teeth is reduced and transferred to the circumference of the entrainment means. This has a crucial influence on the lengthening of the service-life of the entrainment means. Furthermore, marginal stresses are reduced in the contact region of the entrainment means, this being as a result of the fact that slight changes occur at the ends of the entrainment means of the pinion or of the driven toothed wheel. Furthermore, the separate disposition of the teeth leads to the damping of vibrations of the charged transmission, since a lubricating film is formed between the entrainment means and their bearings, said film having a considerable damping effect. When the outer entrainment means of the pinion co-operate with the inner entrainment means of the driven toothed wheel, a considerable number of pairs of entrainment means are already in active connection with minimum charge, namely at the charged side of the entrainment branch. Their number increases with an increasing charge moment of the pinion. In consequence, the chargeability of the respective pair of toothed wheels grows. At the same time, the strength characteristic of the transmission also grows progressively. All of the above-mentioned advantages are achieved with a simultaneous reduction in the technological and financial outlay when producing the cylindrical toothing, namely as a consequence of the fact that conventional integrated teeth are replaced by interchangeable entrainment means having a simple geometrical configuration. These (entrainment means) can be produced as mass-produced products with a high degree of accuracy and economically and are usually used as rolling elements for roller bearings.

One embodiment of the invention is illustrated schematically in the drawing and explained more fully hereinafter. In the drawing.

Figure 1:
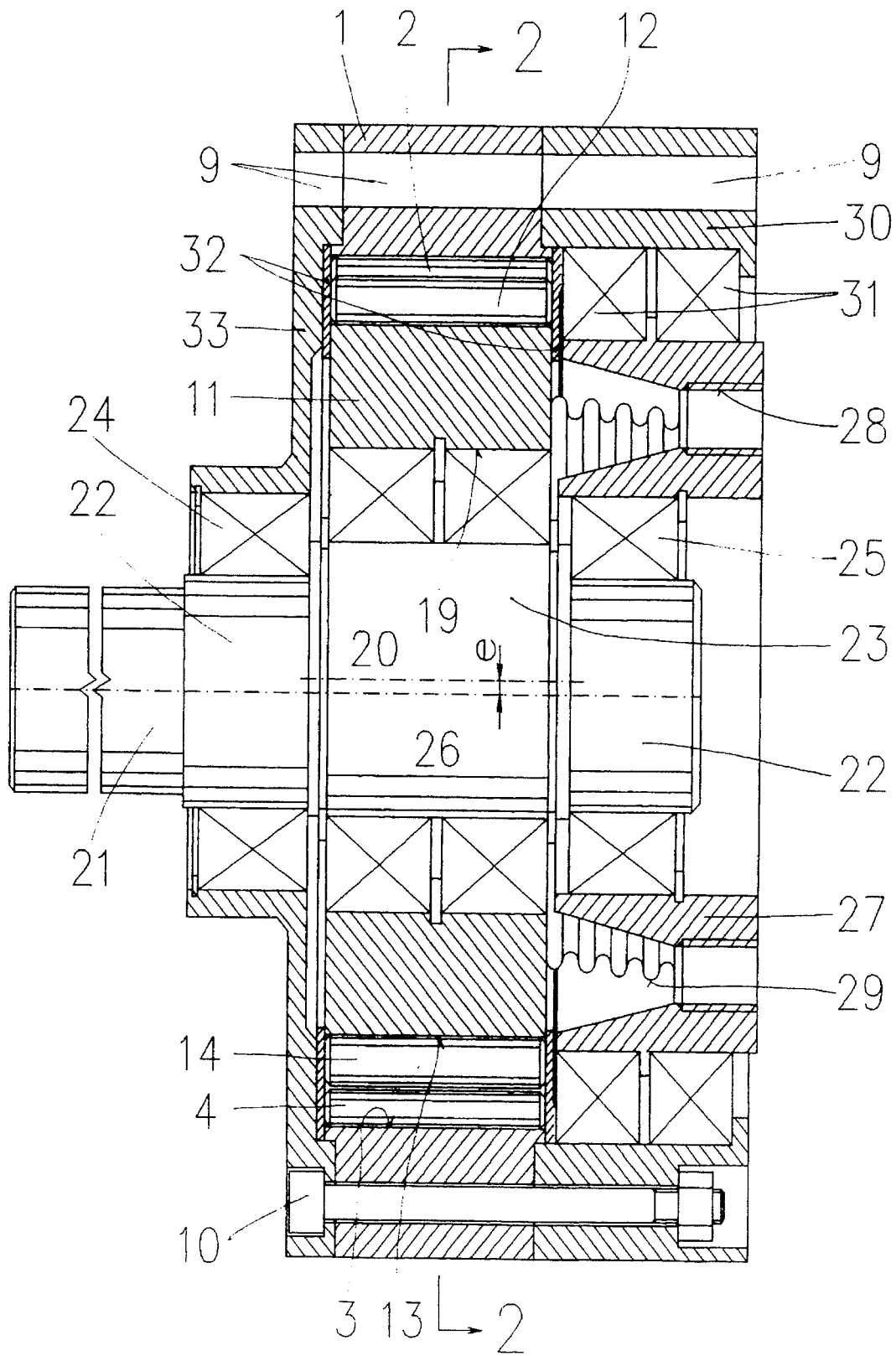
FIG. 1 is a cross-sectional view through a transmission means.
Figure 2:
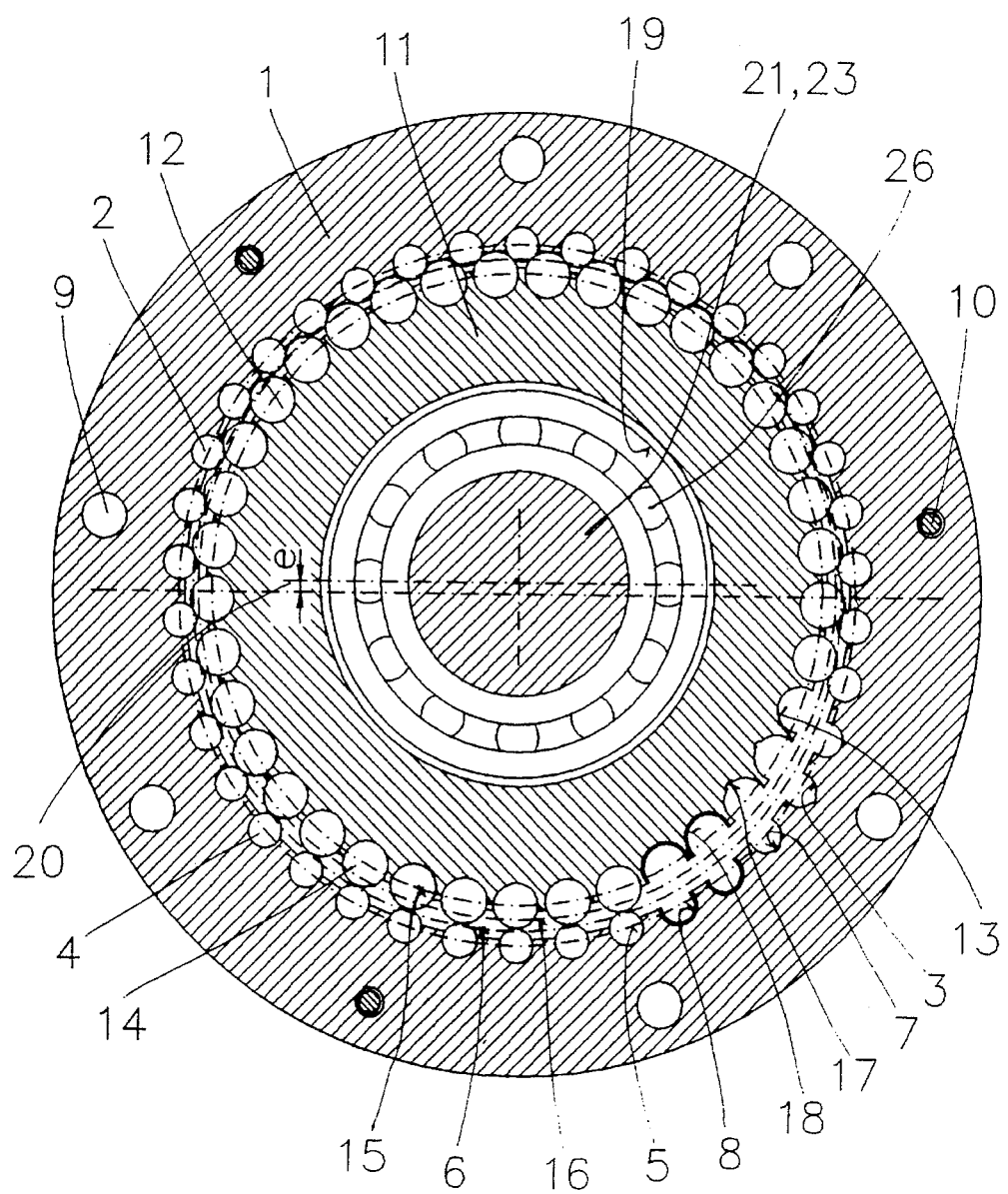
FIG. 2 is a cross-sectional view taken along the line A—A of FIG. 1.
Figure 3:
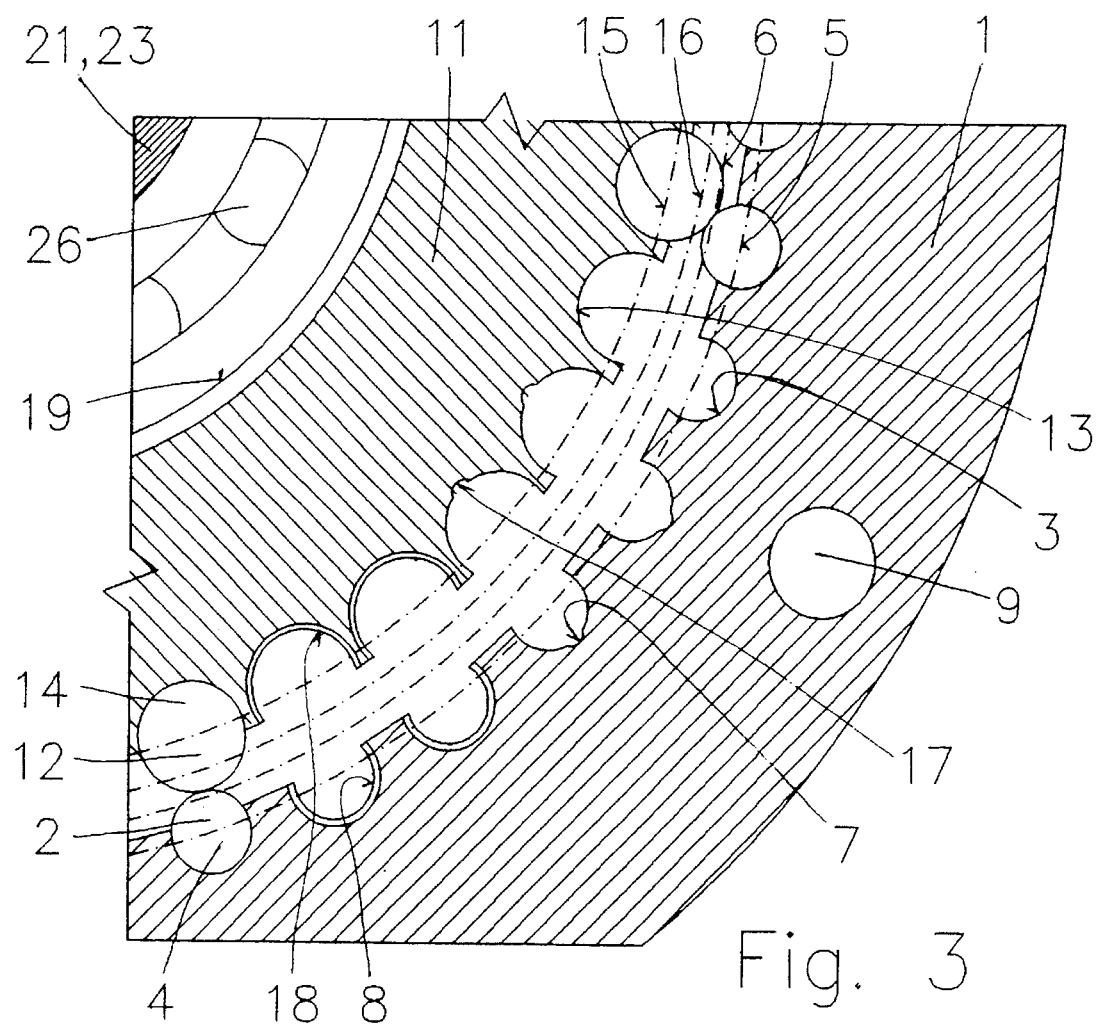
FIG. 3 is an enlarged view of a portion of FIG. 2.
Figure 4:
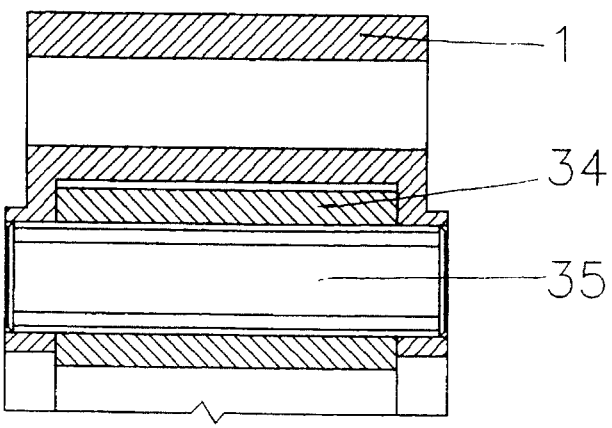
FIG. 4 is an axial sectional view of an entrainment means.

The Figures show that the drive wheel 11 is provided with an external toothing 12, which comprises entrainment means 14. In such case, the entrainment means 14 are formed from needle-like rollers having a slightly modified profile. The ends of the entrainment means are mounted in receiving means 13. The receiving means 13 are uniformly disposed on the outer circumference of a graduated circle 15. The entrainment means 14 are rotatably mounted in the receiving means 13 and prevented from effecting radial movements. This is achieved, in that the receiving means 13 surround the entrainment means 14 by more than 180°. The toothed wheel 1 is provided with an internal toothing 2, which is formed by entrainment means 4. The entrainment means 4 likewise comprise needle-like rollers having a linear profile and are mounted in receiving means 3. The receiving means 3 are uniformly distributed on a central graduated circle 5. The entrainment means 4 are rotatably mounted in the receiving means 3 and simultaneously prevented from effecting radial movements. In such case, the receiving means 3 closely surround the entrainment means 4 by more than 180°. In order to permit a lubricating layer to be formed between the entrainment means and the receiving means, the receiving means 3 and 13 are provided with lubrication grooves 7 and 17. All of the entrainment means 14 of the drive wheel 11 have the same diameter. The same also applies to all of the entrainment means 4 of the toothed wheel 1. In view of the entrainment ratio, the diameter of the entrainment means 14 is greater than the diameter of the entrainment means 4. In such case, the number of entrainment means 14 of the toothed wheel 11 is smaller than the number of entrainment means 4 of the toothed wheel 1 by one. In the axial direction, the movement of the entrainment means 4 and 14 is restricted by lateral supports 32. The toothed wheel 11 is associated with the toothed wheel 1 by a constant distance between the axes, namely of an eccentricity (e), which corresponds to the radial spacing 20 between the axis of the crank part 23 and the axis of the concentric part 22 of the crankshaft 21. On the left-hand side, the crankshaft 21 is mounted in the left-hand bearing 24 and in the flange 33 via the first concentric part 22. The right-hand concentric part 22 of the crankshaft is mounted in the right-hand bearing 25 and in a slow-moving shaft 27.

The flange 33 is non-rotatably connected to the toothed wheel 1. The slow-moving shaft 27 is mounted in the body 30 via a slow-moving bearing 31, the body being non-rotatably connected to the toothed wheel 1. The toothed wheel 11 has a central aperture 19 and is mounted on the eccentric part 23 of the crankshaft 21 via a bearing 26. The rotatably mounted crankshaft 21 brings the toothed wheel 11 into a rapid and eccentric movement. At the same time, the internal toothing 2 of the toothed wheel 1, which toothing co-operates with the external toothing 12, forces the toothed wheel 11 to roll along a rolling circle 16 in a slide-free manner, said circle rolling along a rolling circle 6 of the toothed wheel 1. This rapid, eccentric movement and simultaneous slow rotational movement of the toothed wheel 11 is converted into a slow, central rotational movement of a slow-driving shaft 27 by means of a resilient body 21. The slow-moving shaft 27 is connected to a driven unit via anchoring thread 28, and the toothed wheel 1 is mounted on a base via anchoring apertures 9. In a compact form, the transmission means is provided with mounting screws 10.

The proposed transmission means is especially intended for differential transmission systems, wherein the prerequisites therefor are a minimum clearance, high kinematic accuracy, smooth and quiet running, considerable strength and low energy losses, high specific output, an extremely long service-life and low production costs.

We claim:

1. Transmission means for transmitting a rotary movement, having a driven toothed wheel (1) provided with an internal toothing (2), which is drivably connected to an external toothing (12) of a driving toothed wheel (11), the axes of the toothed wheels (1, 11) extending parallel to one another and having a constant spacing from one another, characterized in that the internal toothing (2) comprises first interchangeable entrainment means (4) and has a circular cross-section, and the external toothing (12) comprises second interchangeable entrainment means (14) and has a circular cross-section, wherein a first receiving means (3) and the first interchangeable entrainment means (4) have complementary cross-sections in their contact region, and wherein a second receiving means (13) and the second interchangeable entrainment means (14) have complementary cross-sections in their contact region.

2. Transmission means for transmitting a rotary movement, having a driven toothed wheel (1) provided with an internal toothing (2), which is drivably connected to an external toothing (12) of a driving toothed wheel (11), the axes of the toothed wheels (1, 11) extending parallel to one another and having a constant spacing from one another, characterized in that the internal toothing (2) comprises first interchangeable entrainment means (4) and has a circular cross-section, and the external toothing (12) comprises second interchangeable entrainment means (14) and has a circular cross-section, wherein a first receiving means (3) and the first interchangeable entrainment means (4) have complementary cross-sections in their contact region, and wherein a second receiving means (13) and the second interchangeable entrainment means (14) have complementary cross-sections in their contact region, wherein the toothed wheels (1, 11) are rotatably mounted on a crankshaft (21).

3. Transmission means for transmitting a rotary movement, having a driven toothed wheel (1) provided with an internal toothing (2), which is drivably connected to an external toothing (12) of a driving toothed wheel (11), the axes of the toothed wheels (1, 11) extending parallel to one another and having a constant spacing from one another, characterized in that the internal toothing (2) comprises first interchangeable entrainment means (4) and has a circular cross-section, and the external toothing (12) comprises second interchangeable entrainment means (14) and has a circular cross-section, wherein a first receiving means (3) and the first interchangeable entrainment means (4) have complementary cross-sections in their contact region, and wherein a second receiving means (13) and the second interchangeable entrainment means (14) have complementary cross-sections in their contact region, wherein the driven toothed wheel (1) is mounted on a concentric part (22) of the crankshaft (21), and the driving toothed wheel (11) is mounted on an eccentric part (23) of the crankshaft (21).

4. Transmission means for transmitting a rotary movement, having a driven toothed wheel (1) provided with an internal toothing (2), which is drivably connected to an external toothing (12) of a driving toothed wheel (11), the axes of the toothed wheels (1, 11) extending parallel to one another and having a constant spacing from one another, characterized in that the internal toothing (2) comprises first interchangeable entrainment means (4) and has a circular cross-section, and the external toothing (12) comprises second interchangeable entrainment means (14) and has a circular cross-section, wherein a first receiving means (3) and the first interchangeable entrainment means (4) have complementary cross-sections in their contact region, and wherein a second receiving means (13) and the second interchangeable entrainment means (14) have complementary cross-sections in their contact region, wherein the axis of rotation of the driving toothed wheel (11) is offset relative to the axis of rotation of the crankshaft (21) by an eccentricity (e), which corresponds to the spacing (20) between the central longitudinal axis of the crankshaft (21) and the central longitudinal axis of the eccentric part (23).

5. Transmission means according to claim 1, characterized in that the first interchangeable entrainment means (4) is configured as rollers having a linear or modified profile, that the second interchangeable entrainment means (14) is configured as rollers having a linear or modified profile, all of the first interchangeable entrainment means (4) and all of the second interchangeable entrainment means (14) having the same circular cross-section in a common sectional plane.

6. Transmission means for transmitting a rotary movement, having a driven toothed wheel (1) provided with an internal toothing (2), which is drivably connected to an external toothing (12) of a driving toothed wheel (11), the axes of the toothed wheels (1, 11) extending parallel to one another and having a constant spacing from one another, characterized in that the internal toothing (2) comprises first interchangeable entrainment means (4) and has a circular cross-section, and the external toothing (12) comprises second interchangeable entrainment means (14) and has a circular cross-section, wherein a first receiving means (3) and the first interchangeable entrainment means (4) have complementary cross-sections in their contact region, and wherein a second receiving means (13) and the second interchangeable entrainment means (14) have complementary cross-sections in their contact region, wherein the number of teeth of the external toothing (12) is smaller than the number of teeth of the internal toothing (2).

7. Transmission means according to claim 1 characterised in that the receiving means (3, 13) have an arcuate or gothic profile in the radial cross-section, the receiving means (3, 13) of the respective toothed wheels (1, 11) having the same profile in radial sectional planes.

8. Transmission means for transmitting a rotary movement, having a driven toothed wheel (1) provided with an internal toothing (2), which is drivably connected to an external toothing (12) of a driving toothed wheel (11), the axes of the toothed wheels (1, 11) extending parallel to one another and having a constant spacing from one another, characterized in that the internal toothing (2) comprises first interchangeable entrainment means (4) and has a circular cross-section, and the external toothing (12) comprises second interchangeable entrainment means (14) and has a circular cross-section, wherein a first receiving means (3) and the first interchangeable entrainment means (4) have complementary cross-sections in their contact region, and wherein a second receiving means (13) and the second interchangeable entrainment means (14) have complementary cross-sections in their contact region, wherein the first receiving means (3) and/or the second receiving means (13) have or has longitudinally oriented lubrication grooves (7, 17).

9. Transmission means according to claim 1, characterized in that the first receiving means (3) and/or the second receiving means (13) are or is covered with bearing bodies (8, 18).

10. Transmission means according to claim 1 characterised in that the entrainment means (4) comprise sleeves (34), which are rotatably mounted on pins (35).

11. A transmission means for transmitting a rotary movement, comprising a driven toothed wheel provided with an internal toothing and having an axis;

a driving toothed wheel provided with an external toothing and having an axis, wherein the internal toothing of the driven toothed wheel is drivably connected to the external toothing of the driving toothed wheel, and wherein the axis of the driven toothed wheel and the axis of the driving toothed wheel extend parallel to one another and have a constant spacing from one another;

a first interchangeable entrainment means for the internal toothing having a circular cross-section;

a second interchangeable entrainment means for the external toothing having a circular cross-section;

a first receiving means for the first interchangeable entrainment means, wherein first receiving means and the first interchangeable entrainment means have complementary profiles in their contact region, and wherein the first interchangeable entrainment means is rotatably mounted in the first receiving means and simultaneously prevented from effecting a radial movement;

a second receiving means for the second interchangeable entrainment means, wherein the second receiving means and the second interchangeable entrainment means have complementary profiles in their contact region, and wherein the second interchangeable entrainment means is rotatably mounted in the second receiving means and simultaneously prevented from effecting a radial movement.

12. A transmission means for transmitting a rotary movement according to claim 11, further comprising a crankshaft having an eccentric part and a concentric part;

wherein the driving toothed wheel and the driven toothed wheel are rotatably mounted on the crankshaft.

13. A transmission means for transmitting a rotary movement according to claim 11, further comprising a crankshaft having an eccentric part and a concentric part;

wherein the driven toothed wheel is mounted on the concentric part of the crankshaft, and wherein the driving toothed wheel is mounted on the eccentric part of the crankshaft.

14. A transmission means for transmitting a rotary movement according to claim 13, further comprising a spacing between a central longitudinal axis of the crankshaft and a central longitudinal axis of the eccentric part, wherein an axis of rotation of the driving toothed wheel is offset relative to an axis of rotation of the crankshaft by an eccentricity which corresponds to said spacing between the central longitudinal axis of the crankshaft and the central longitudinal axis of the eccentric part.

15. A transmission means for transmitting a rotary movement according to claim 11, wherein the first interchangeable entrainment means is configured as rollers having a linear or modified profile, and wherein the second interchangeable entrainment means is configured as rollers having a linear or modified profile, all of the first interchangeable entrainment means and all of the second interchangeable entrainment means having the same circular cross-section in a common sectional plane.

16. A transmission means for transmitting a rotary movement according to claim 11, wherein the number of teeth of the external toothing is smaller than the number of teeth of the internal toothing.

17. A transmission means for transmitting a rotary movement according to claim 11, wherein the first receiving means and the second receiving means have in each case an arcuate profile in a radial cross-section, and wherein the first receiving means of the driven toothed wheel and the second receiving means of the driving toothed wheel have the same profile in radial sectional planes.

18. A transmission means for transmitting a rotary movement according to claim 11, wherein the first receiving means and the second receiving means have in each case a gothic profile in a radial cross-section, and wherein the first receiving means of the driven toothed wheel and the second receiving means of the driving toothed wheel have the same profile in radial sectional planes.

19. A transmission means for transmitting a rotary movement according to claim 11, further comprising longitudinally oriented lubrication grooves disposed at least at one of the first receiving means and the second receiving means.

20. A transmission means for transmitting a rotary movement according to claim 11, further comprising bearing bodies covering at least one of the first receiving means and the second receiving means.

21. A transmission means for transmitting a rotary movement according to claim 11, further comprising sleeves rotatably mounted on pins to the first interchangeable entrainment means.

* * * * *

UNITED STATES PATENT AND TRADEMARK OFFICE
CERTIFICATE OF CORRECTION

PATENT NO. : 5,609,539
DATED : March 11, 1997
INVENTOR(S) : Jozef Herstek, Bartolomej Janek It is certified that error appears in the above-indentified patent and that said Letters Patent is hereby corrected as shown below:

Title page: Item [22] PCT Filed: delete "1992" and insert --1993--.

On the title page: Item [30] should read -- [CS]Czechoslovakia --.

Signed and Sealed this

Nineteenth Day of August, 1997

*Attest:*

BRUCE LEHMAN

*Attesting Officer*  Commissioner of Patents and Trademarks